(12) United States Patent
Manousakis et al.

(10) Patent No.: US 12,072,749 B2
(45) Date of Patent: *Aug. 27, 2024

(54) MACHINE LEARNING-BASED POWER CAPPING AND VIRTUAL MACHINE PLACEMENT IN CLOUD PLATFORMS

(71) Applicant: Microsoft Technology Licensing, LLC, Redmond, WA (US)

(72) Inventors: Ioannis Manousakis, Redmond, WA (US); Marcus F. Fontoura, Medina, WA (US); Alok Gautam Kumbhare, Redmond, WA (US); Ricardo G. Bianchini, Bellevue, WA (US); Nithish Mahalingam, Sammamish, WA (US); Reza Azimi, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 344 days.

This patent is subject to a terminal disclaimer.

(21) Appl. No.: 17/558,067

(22) Filed: Dec. 21, 2021

(65) Prior Publication Data

US 2022/0114022 A1 Apr. 14, 2022

Related U.S. Application Data

(63) Continuation of application No. 16/595,669, filed on Oct. 8, 2019, now Pat. No. 11,237,868.

(51) Int. Cl.
*G06F 1/32* (2019.01)
*G06F 1/324* (2019.01)
(Continued)

(52) U.S. Cl.
CPC ............... *G06F 1/32* (2013.01); *G06F 1/324* (2013.01); *G06F 9/45558* (2013.01);
(Continued)

(58) Field of Classification Search
CPC .... G06F 9/5005; G06F 9/45558; G06F 1/324; G06F 2009/4557
See application file for complete search history.

(56) References Cited

U.S. PATENT DOCUMENTS 9,684,531 B2 * 6/2017 Jacobs .................... H04L 47/74
2015/0234450 A1 * 8/2015 Lin ........................ G06F 1/3293
713/323

(Continued)

*Primary Examiner* — Jacob D Dascomb
(74) *Attorney, Agent, or Firm* — Ranjeev Singh; Singh Law, PLLC

(57) ABSTRACT

Systems and methods for machine learning-based power capping and virtual machine placement in cloud platforms are disclosed. A method includes applying a machine learning model to predict whether a request for deployment of a virtual machine corresponds to deployment of a user-facing (UF) virtual machine or a non-user-facing (NUF) virtual machine. The method further includes sorting a list of candidate servers based on both a chassis score and a server score for each server to determine a ranked list of the candidate servers, where the server score depends at least on whether the request for the deployment of the virtual machine is determined to be a request for a deployment of a UF virtual machine or a request for a deployment of an NUF virtual machine. The method further includes deploying the virtual machine to a server with highest rank among the ranked list of the candidate servers.

20 Claims, 9 Drawing Sheets

(51) Int. Cl.
*G06F 9/455* (2018.01)
*G06F 9/50* (2006.01)
*G06N 20/00* (2019.01)

(52) U.S. Cl.
CPC .......... *G06F 9/5005* (2013.01); *G06N 20/00* (2019.01); *G06F 2009/4557* (2013.01)

(56) References Cited

U.S. PATENT DOCUMENTS

2018/0225137 A1* 8/2018 Bianchini ............. G06F 9/5005
2019/0245757 A1* 8/2019 Meyer ................ H04L 41/5051

* cited by examiner

MACHINE LEARNING-BASED POWER CAPPING AND VIRTUAL MACHINE PLACEMENT IN CLOUD PLATFORMS

CROSS-REFERENCE TO RELATED APPLICATION(S)

This application is a continuation of U.S. patent application Ser. No. 16/595,669, filed on Oct. 8, 2019, entitled "MACHINE LEARNING-BASED POWER CAPPING AND VIRTUAL MACHINE PLACEMENT IN CLOUD PLATFORMS," the entire contents of which are hereby incorporated herein by reference.

BACKGROUND

The public cloud includes a global network of servers that perform a variety of functions, including storing and managing data, running applications, and delivering content or services, such as streaming videos, provisioning electronic mail, providing office productivity software, or handling social media. The servers and other components may be located in data centers across the world. While the public cloud offers services to the public over the Internet, businesses may use private clouds or hybrid clouds. Both private and hybrid clouds also include a network of servers housed in data centers.

Managing power in a data center is difficult because of the variable demand for power from the servers. In addition, the various customer workloads vary in terms of their resource utilization, lifetime, and other aspects.

SUMMARY

In one example, the present disclosure relates to a method, implemented by a processor, for deploying virtual machines to servers housed in respective chassis. The method may include applying a machine learning model to predict whether a request for deployment of a virtual machine corresponds to deployment of a user-facing virtual machine or a non-user-facing virtual machine. The method may further include using the processor, sorting a list of candidate servers based on both a chassis score and a server score for each server in the list of the candidate servers to determine a ranked list of the candidate servers, where the server score depends at least on whether the request for the deployment of the virtual machine is a request for a deployment of the user-facing virtual machine or a request for a deployment of the non-user-facing virtual machine. The method may further include using the processor, deploying the virtual machine to a server with highest rank among the ranked list of the candidate servers.

In another example, the present disclosure relates to a system, including a processor, for deploying virtual machines to servers housed in respective chassis. The system may be configured to apply a machine learning model to predict whether a request for deployment of a virtual machine corresponds to deployment of a user-facing virtual machine or a non-user-facing virtual machine. The system may further be configured to sort a list of candidate servers based on both a chassis score and a server score for each server in the list of the candidate servers to determine a ranked list of the candidate servers, where the server score depends at least on whether the request for the deployment of the virtual machine is a request for a deployment of a user-facing virtual machine or a request for a deployment of a non-user-facing virtual machine. The system may further be configured to, using the processor, deploy the virtual machine to a server with highest rank among the ranked list of the candidate servers.

In yet another example, the present disclosure relates to a method, implemented by a processor, for deploying virtual machines to servers housed in respective chassis. The method may include predicting whether a request for deployment of a virtual machine corresponds to deployment of a user-facing virtual machine or a non-user facing virtual machine. The method may further include using the processor, determining a chassis score for each server in a list of candidate servers for deployment of the virtual machine. The method may further include using the processor, determining a server score for each server in the list of the candidate servers, where the server score is determined using a first method if the virtual machine is determined to be a user-facing virtual machine, and where the server score is determined using a second method, different from the first method, if the virtual machine is determined to be a non-user facing virtual machine. The method may further include using the processor, sorting the list of the candidate servers based on both the chassis score and the server score to determine a ranked list of the candidate servers. The method may further include using the processor, deploying the virtual machine to a server with highest rank among the ranked list of the candidate servers. The method may further include assigning the user-facing virtual machine to a first group of cores associated with the server if the request for the deployment of the virtual machine is determined to be for the user-facing virtual machine, or else assigning the non-user-facing virtual machine to a second group of cores associated with the server. The method may further include in response to a first power alert associated with a chassis comprising the server, lowering a frequency of the second group of cores.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Examples described in this disclosure relate to machine learning-based power capping and virtual machine (VM) placement in cloud platforms. Certain examples relate to per-VM power capping and deploying the virtual machines based on machine learning in a data center for the public cloud. The public cloud includes a global network of servers that perform a variety of functions, including storing and managing data, running applications, and delivering content or services, such as streaming videos, electronic mail, office productivity software, or social media. The servers and other components may be located in data centers across the world. While the public cloud offers services to the public over the Internet, businesses may use private clouds or hybrid clouds. Both private and hybrid clouds also include a network of servers housed in data centers. Power is the driving resource in data center design. Designers typically rely on conservative estimates of IT equipment power consumption to provision other resources (e.g., space, cooling, and networking). However, actual power draw spikes rarely and such power draw is often much lower than these estimates. This results in underutilization of resources in the data centers and thus more data centers are built to satisfy demand. Managing power in data centers associated with public cloud is difficult as server power characteristics vary due to multi-tenancy, varying virtual machine (VM) mixes, and diverse black-box workloads. Under these conditions, data center designers typically severely limit the amount of oversubscription so that workload performance is never impacted.

Designers can, however, use machine learning (ML) systems to increase oversubscription significantly without affecting the performance-critical workloads. The present disclosure relates to leveraging predictions of workload performance criticality and resource utilization in power capping and VM placement. Specifically, the present disclosure relates to: (1) a fine-grained per-VM power capping system that protects the performance-critical workloads; and (2) a criticality and utilization aware VM placement policy that distributes VMs across a cluster to reduce the number of expected capping events and their performance impact.

Figure 1:
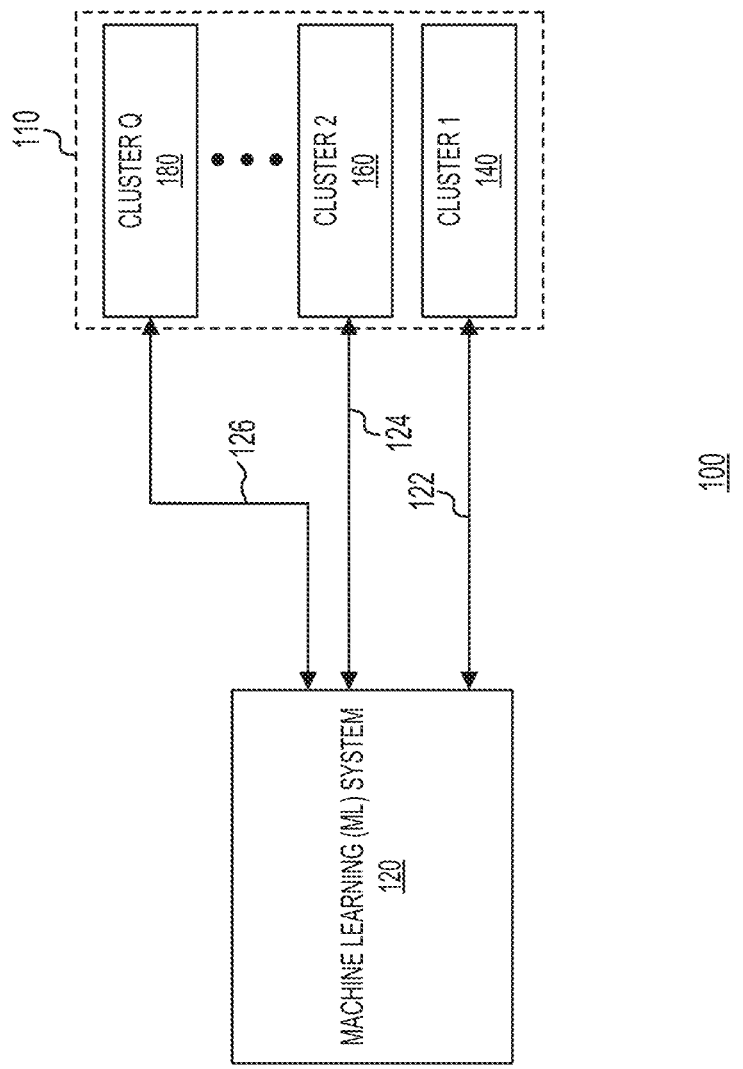
FIG. 1 is a block diagram of a system including a machine learning (ML) system and a set of clusters in accordance with one example.

FIG. 1 is a block diagram of a system 100 including a machine learning (ML) system 120 coupled to a set of clusters 110 in accordance with one example. The set of clusters may be included as part of a data center. As used in this disclosure, the term data center may include, but is not limited to, some or all of the data centers owned by a cloud service provider, some or all of the data centers owned and operated by a cloud service provider, some or all of the data centers owned by a cloud service provider that are operated by a customer of the service provider, any other combination of the data centers, a single data center, or even some clusters in a particular data center. In this example, set of clusters 110 may include cluster 1 140, cluster 2 160, and cluster Q 180, where Q may be an integer greater than 1. Cluster 1 140 may be coupled via a bus 122 to ML system 120; cluster 2 160 may be coupled via bus 124 to ML system 120; and cluster Q 180 may be coupled via bus 126 to ML system 120. In this example, each cluster may include identical servers. Thus, cluster 1 140 may include servers including a certain number of CPU cores and a certain amount of memory. Cluster 2 160 may include servers that may have a different number of CPU cores per server and a different amount of memory relative to the servers included in cluster 1 140. Although not shown in FIG. 1, ML system 120 may be coupled via any number of intervening networks (e.g., wide area networks, optical networks, wireless networks, wired networks, or other types of networks) to any of the clusters shown in FIG. 1. Thus, the term bus as used in this disclosure includes, but is not limited to, signal lines, signal lines coupled via routers, switches, other networking equipment, signal lines coupled via networks of any kind, wireless connections, a combination of signal lines and wireless connections, switch fabrics, or the like. Although FIG. 1 shows a certain number of clusters of set of clusters 110 arranged in a certain manner, set of clusters 110 may include additional or fewer clusters. In addition, although FIG. 1 shows a certain arrangement of ML system 120 in relation to set of clusters 110, ML system 120 may be arranged differently, including in parts that are distributed over several locations and are interconnected via different types of networks or buses.

Figure 2:
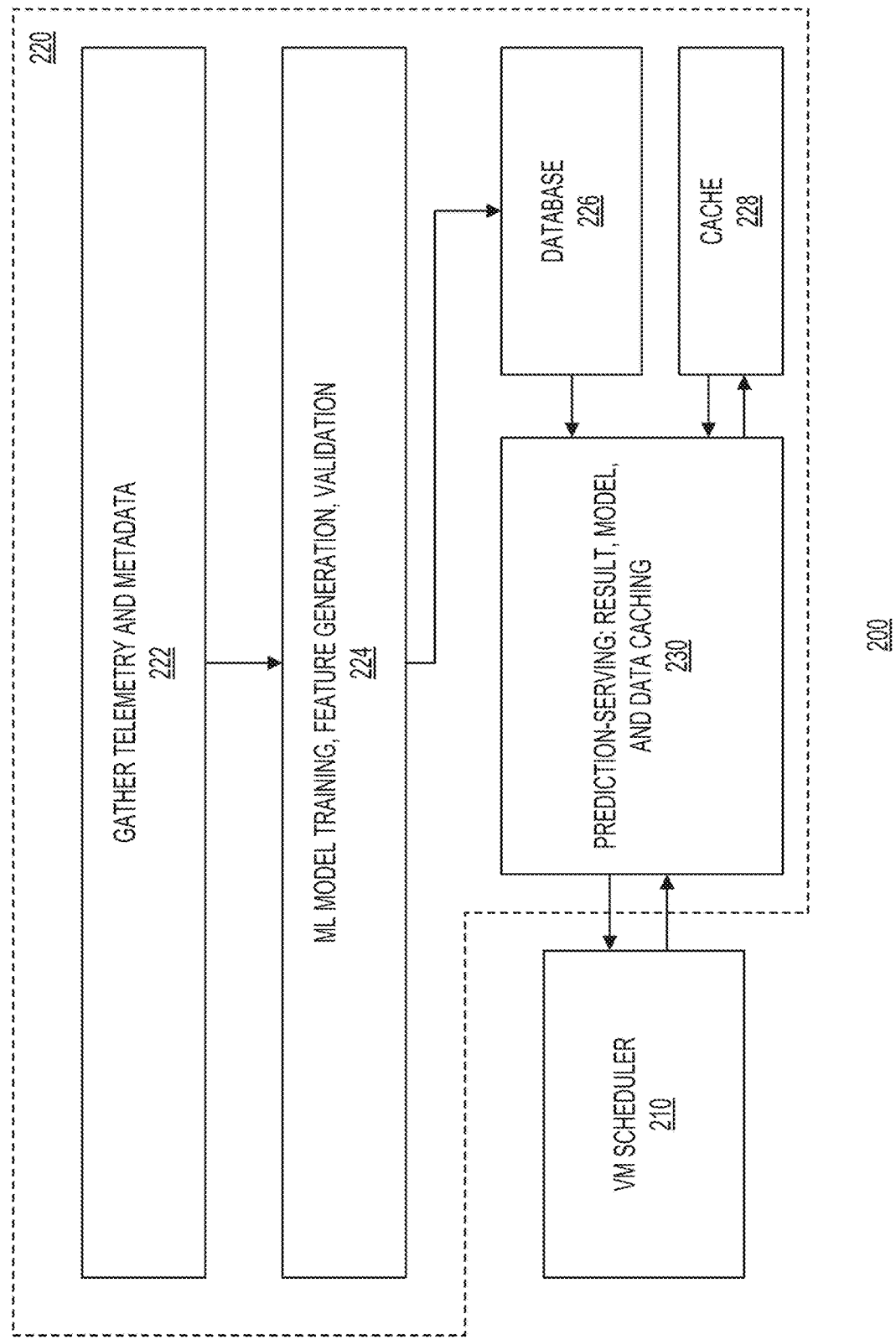
FIG. 2 is a block diagram of a system including a VM scheduler coupled to an ML system in accordance with one example.

FIG. 2 is a block diagram of a system 200 including a VM scheduler 210 coupled to an ML system 220 in accordance with one example. In this example, the functionality of VM scheduler 210 is described in the context of a public cloud provider. Each request for a virtual machine (VM) in the public cloud may be routed to VM scheduler 210. In this example, VM scheduler 210 may be configured to place a new VM on any of a set of identical servers that make up a cluster (e.g., any one of the clusters shown in FIG. 1) of servers. Additional details with respect to the placement of VMs by VM scheduler 210 are provided later.

With continued reference to FIG. 2, ML system 220 may include several functional blocks configured to perform various functions associated with ML system 220. ML system 220 may include both offline training components and online prediction components. Offline training components may be responsible for training of the various machine language models, validating the models, and publishing the validated models. Offline training components may include block 222 and block 224. Online prediction components may generate predictions concerning various aspects, including whether the VM requesting deployment is a user-facing VM or a non-user-facing VM. Other predictions may relate to metrics, such as average CPU utilization of the VM, $95^{th}$-percentile utilization, deployment size (e.g., in terms of the number of CPU cores), and the VM lifetime. Block 222 may be configured to gather telemetry from VMs and servers and metadata about cloud subscriptions, users, VMs, and servers. Block 222 may obtain such telemetry data from cloud monitoring systems or from sensors specifically configured to obtain the telemetry data. Block 222 may further include instructions to format and clean up the data, as needed. Block 224 may be used to train various ML models for making the various predictions based on the collected data. Block 224 may be configured to: (1) periodically generate ML models and features based on the telemetry and metadata, as defined by a data scientist; (2) validate that the models and features were generated correctly; and (3) publish the validated models and features to a data store (e.g., database 226). Prior to training the ML models, features that allow the ML models to predict a metric based on the inputs may be selected. The training phase may include using backward propagation, or other techniques, allowing the ML models to learn a relationship between certain input parameters and certain predictions based on the parameters. As an example, neural network models trained using stochastic gradient descent may be used to classify a VM as likely to be a user-facing VM or a non-user-facing VM.

In a public cloud, it is difficult to determine with absolute certainty that a black-box VM is running a user-facing workload. Instead, in one example, using an appropriate ML model, one can infer the likelihood of a VM running a user-facing workload based on the periodicity in the VM's historical average CPU utilization signal. This is because user-facing workloads may exhibit utilization patterns that approximately repeat daily (high during the day and low at night, or vice-versa). In this example, using the Fast Fourier Transform (FFT) algorithm, as part of block 224 one may detect periodicity in VMs that execute for at least 3 days. The FFT may be used to detect periodicity at multiple time scales, but a workload may be classified as user-facing only when that workload has a periodicity consistent with human behavior.

The workload of some background VMs may exhibit periods consistent with human behavior. This issue may be addressed by being conservative during classification of VMs; thus, it is acceptable to classify a non-user-facing workload as user-facing, but not vice-versa. Moreover, some daily batch jobs have strict deadlines, so classifying them as user-facing may correctly reflect their performance needs. This way, the algorithm works well even when the CPU is not the dominant resource, because the CPU is always a good proxy for periodicity (e.g., network-bound interactive workloads may exhibit more CPU activity during the day than at night). The periodicity analysis produces ground-truth labels that can be used in training an ML model to predict that a VM will likely execute a user-facing workload. In this example, an Extreme Gradient Boosting Tree may be used for the ML model and a large number of features (e.g., cloud subscription ID, user who created the VM, VM type, VM size, and guest operating system) may be used to classify a VM as potentially user-facing or non-user-facing.

Similarly, a Random Forest model may leverage many features to predict 95th-percentile VM CPU utilization at deployment time. Since predicting utilization exactly is difficult, in this example, the model may predict into four buckets: 0%-25%, 26%-50%, 51%-75%, and 76%-100%. In one example, the CPU utilization measurements may correspond to 5-minute intervals. The cumulative distribution function (CDF) of the $95^{th}$ percentile of the maximum virtual CPU utilization may be quantified. The relationship between data, such as cloud subscription ID, user who created the VM, VM type, VM size, and guest operating system and the $95^{th}$-percentile VM CPU unitization may be learned by the Random Forest model during the training phase. The models and the data, as needed, may be stored in database 226.

Still referring to FIG. 2, upon a request from a client (e.g., VM scheduler 210), the online component, in one example, (1) checks its result cache (e.g., cache 228) to see if the same request has been served recently; (2) if not, it checks its cache (e.g., cache 228) of models and features and loads them from the store into the cache on a miss; (3) it then executes the model (e.g., lifetime) using the pre-generated features (e.g., percentage of times a VM of subscription X was predicted to live for a day) and any features that came with the request itself (e.g., subscription ID, guest operating system); (4) caches the result; and finally (5) it serves the prediction and a confidence score. Thus, as part of block 230 any ML models that may have been created to predict may be deployed.

Although FIG. 2 shows certain aspects of ML system 220, ML system 220 may include additional or fewer aspects. As an example, other types of ML models, including Bayesian models may be used. In general, one may implement a supervised learning algorithm that can be trained based on input data and once it is trained it can make predictions or prescriptions based on the training. Any of the learning and inference techniques such as Linear Regression, Support Vector Machine (SVM) set up for regression, Random Forest set up for regression, Gradient-boosting trees set up for regression and neural networks may be used. Linear regression may include modeling the past relationship between independent variables and dependent output variables. Neural networks may include artificial neurons used to create an input layer, one or more hidden layers, and an output layer. Each layer may be encoded as matrices or vectors of weights expressed in the form of coefficients or constants that might have been obtained via off-line training of the neural network. Neural networks may be implemented as Recurrent Neural Networks (RNNs), Long Short Term Memory (LSTM) neural networks, or Gated Recurrent Unit (GRUs). All of the information required by a supervised learning-based model may be translated into vector representations corresponding to any of these techniques.

Taking the LSTM example, an LSTM network may comprise a sequence of repeating RNN layers or other types of layers. Each layer of the LSTM network may consume an input at a given time step, e.g., a layer's state from a previous time step, and may produce a new set of outputs or states. In the case of using the LSTM, a single chunk of content may be encoded into a single vector or multiple vectors. As an example, a word or a combination of words (e.g., a phrase, a sentence, or a paragraph) may be encoded as a single vector. Each chunk may be encoded into an individual layer (e.g., a particular time step) of an LSTM network. An LSTM layer may be described using a set of equations, such as the ones below:

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$c_t = f_t c_{t-1} i_t \tanh(W_{xc}x_t + W_{hc}h_{t-1} + b_c)$$

$$o_t = \sigma(W_{xo}x_t + W_{ho}h_{t-1} + W_{co}c_t + b_o)$$

$$h_t = o_t \tanh(c_t)$$

In this example, inside each LSTM layer, the inputs and hidden states may be processed using a combination of vector operations (e.g., dot-product, inner product, or vector addition) or non-linear operations, if needed.

The instructions corresponding to the machine learning system could be encoded as hardware corresponding to an A/I processor. In this case, some or all of the functionality associated with the learning-based analyzer may be hard-coded or otherwise provided as part of an A/I processor. As an example, A/I processor may be implemented using an FPGA with the requisite functionality.

Figure 3:
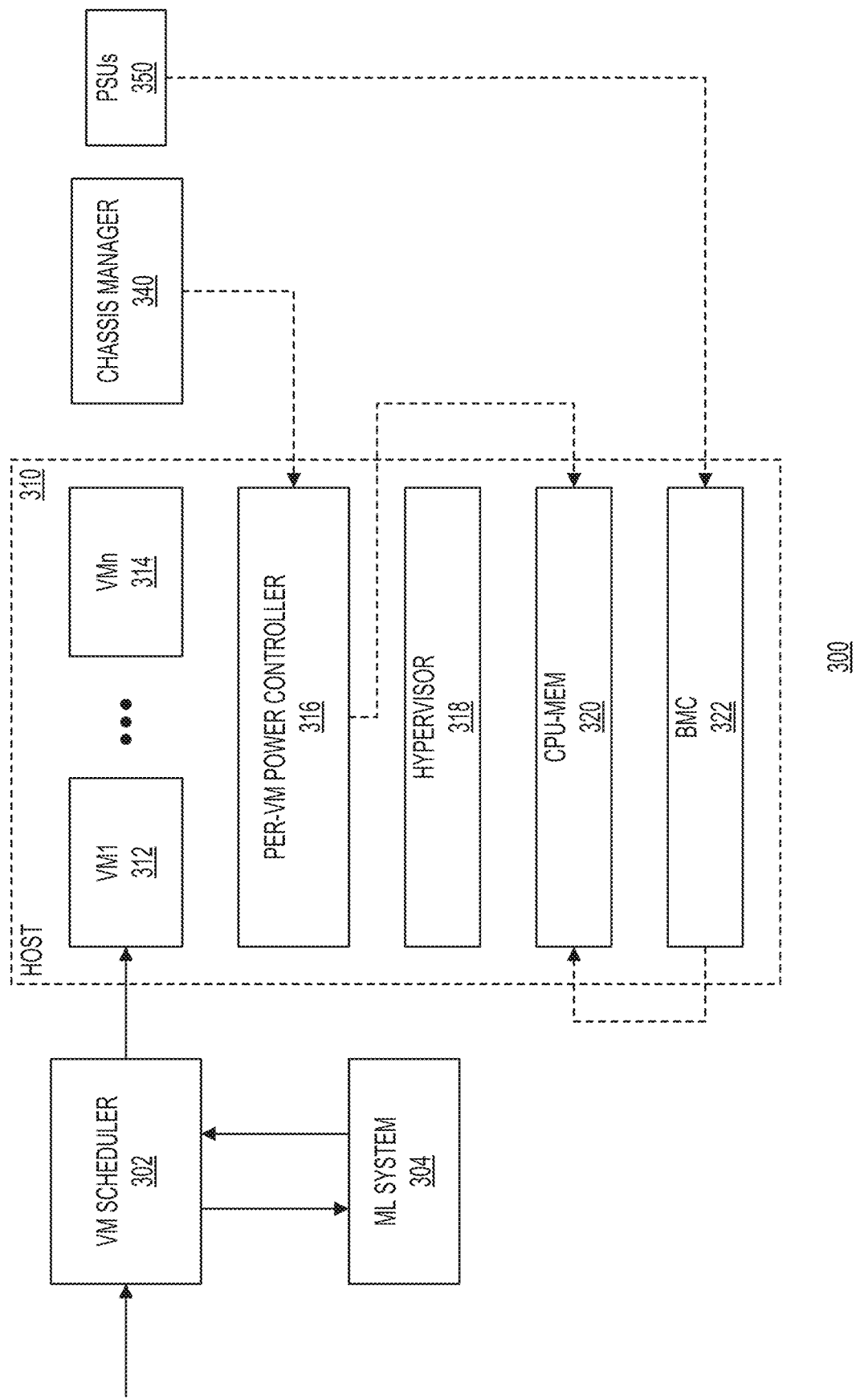
FIG. 3 shows a system environment for ML-enabled power-capping and workload placement in accordance with one example.

FIG. 3 shows a system environment 300 for ML-enabled power-capping and workload placement. System 300 may include a virtual machine (VM) scheduler 302, a machine-learning (ML) system 304, a host 310, a chassis manager 340 and power supply units (PSUs) 350. VM scheduler 302 may be configured to receive requests for VMs and schedule the placement of the VMs. ML system 304 may be configured to provide workload predictions to VM scheduler 302. A request to deploy a set of VMs may arrive at VM scheduler 302. In this example, VM scheduler 302 may then send a query to ML system 304 to request workload predictions. ML system 304 may provide workload predictions. Using these predictions, VM scheduler 302 may decide on which servers to place the VMs. As an example, VM scheduler 302 may place VMn 314 on host 310. After selecting a VM placement, VM scheduler 302 may inform the target server's per-VM power controller about the VM's work-load type.

Host 310 may also include hypervisor 318 and computer-memory resources (CPU-MEM 320). Hypervisor 318 may manage the virtual machines. CPU-MEM 320 may include processing cores and memory that may be assigned to each VM being hosted by host 310. As explained later with respect to FIG. 4, VMs may be assigned to respective groups of cores. Hypervisor 310 may ensure that any threads associated with any given VM are scheduled only on the logical cores of its group.

Each chassis manager (e.g., chassis manager 340) may frequently poll its local PSUs (e.g., PSUs 350) to determine whether the power budget for the chassis is about to be exceeded. When this is the case, chassis manager 340 may send an alter to the controller of each server in the chassis. In one example, chassis manager 340 polls the PSUs 350 every 200 milliseconds and alerts the in-band controller when the chassis power draw is above a threshold close to the chassis budget. Per-VM power controller 316 may use per-core dynamic voltage frequency scaling (DVFS) to cap the cores running non-user-facing VMs. In this example, to account for (1) high power draws that may occur between polls or (2) the inability of the controller to bring power down below the chassis limit, the out-of-band mechanisms may be used as a backup. Upon receiving the alert, per-VM power controller 316 at each server (e.g., host 310) may apportion the server's share of the chassis power budget across the local VMs based on their workload types. Per-VM power controller 316 may accomplish this by first throttling the CPU cores used by non-performance-critical VMs (e.g., non-user-facing VMs). Throttling just these VMs may be enough to keep the power draw below the chassis budget and protect the user-facing VMs. If it is not enough, the PSUs 350 may alert the servers' baseboard management controllers (BMC)s (e.g., PSUs 350 may send an alert to BMC 322), which may then use an out-of-band mechanism, such as running average power limit (RAPL) to bring the chassis power down.

Figure 4:
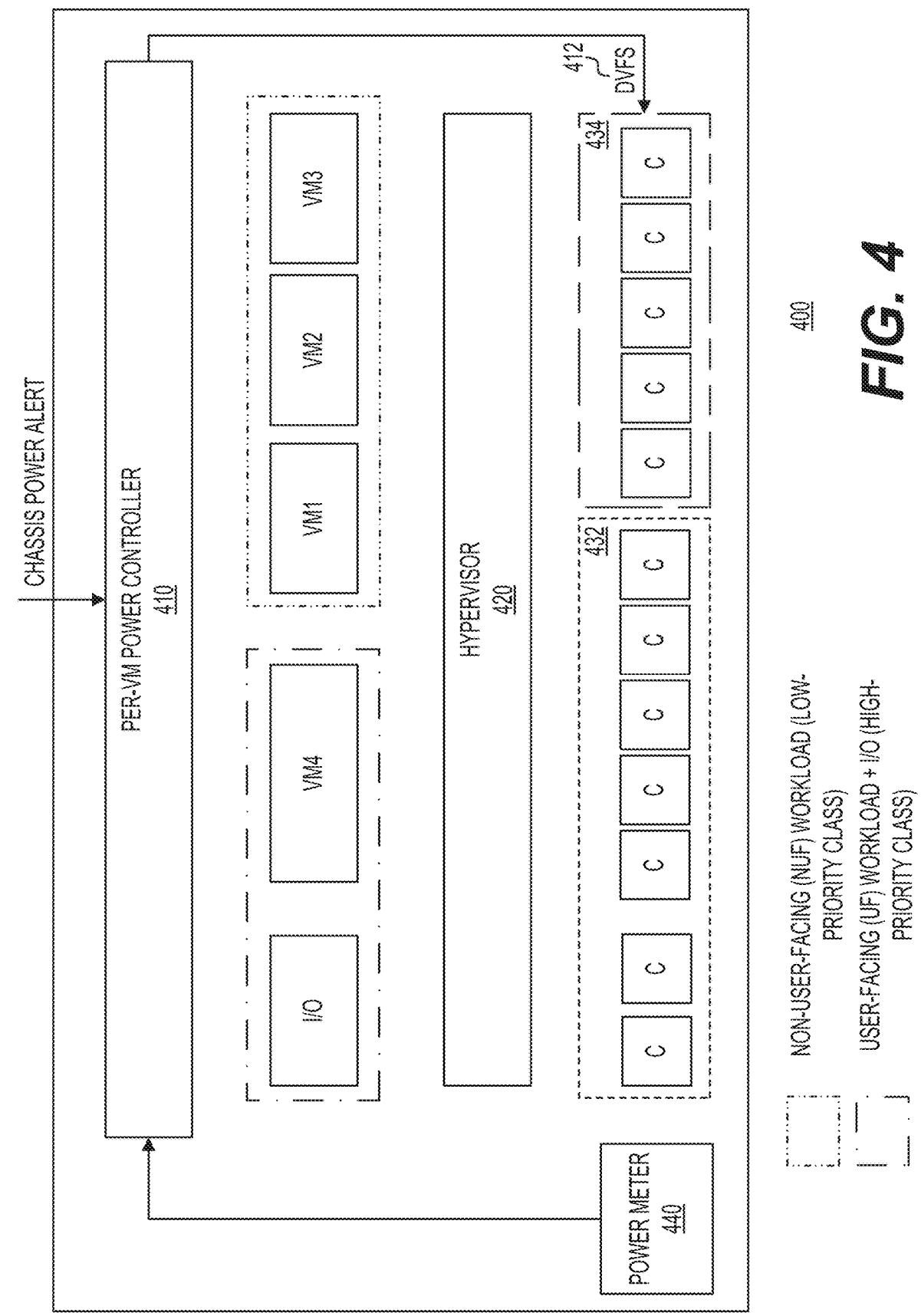
FIG. 4 shows a diagram of a system 400 including a per-VM power controller in accordance with one example.

FIG. 4 shows a diagram of a system 400 including a per-VM power controller 410. Per-VM power controller 410 may provide similar functionality as per-VM power controller 316 of FIG. 3. To power-manage the cores per-VM, the core-grouping feature of the hypervisor (e.g., cpupools in Xen, cpugroups in Hyper-V) may be used to split the logical cores into two classes: high-priority and low-priority. The user-facing VMs (e.g., VM4 of FIG. 4) and the I/O VM (e.g., Domain0 in Xen, Root VM in Hyper-V) may be assigned to the high-priority class, and the non-user-facing VMs may be assigned to the low-priority class. Hypervisor 420 may be configured to ensure that any threads associated with the given VM are scheduled only on the logical cores of its group. An empty server may start with the cores reserved for the I/O VM in the high-priority class and all other cores in the low-priority class. When a user-facing VM arrives, a corresponding number of logical cores (as defined by the VM size) may be moved from the low-priority class to the high-priority one, and the VM may be assigned to the high-priority class. An arriving non-user-facing VM can just be assigned to the low-priority class.

Upon receiving an alert from the chassis manager, per-VM power controller 410 may be configured to ensure that the server's power draw stays below its even share of the chassis power budget. If the current draw is higher than this share, per-VM power controller 410 may immediately lower the frequency of the low-priority cores to the minimum p-state (e.g., half of the maximum frequency); the lowering of the frequency entails a lowering of the voltage as well. In this example, per-VM controller 410 may use DVFS 412 to lower the voltage. Per-VM power controller 410 may be configured to lower the server's power draw as quickly as possible without affecting the important workloads. However, this large frequency reduction may overshoot the needed power reduction. To reduce the impact on the non-user-facing VMs, per-VM power controller 410 may enter a feedback loop where each iteration involves (1) checking the server power meter (e.g., power meter 440) and (2) repeatedly increasing the frequency of N low-priority cores to the next higher p-state, until the server power is close to its even share. Per-VM power controller 410 may select the highest frequency that keeps the power below this threshold.

In some situations, cutting the frequency of the low-priority cores in half may not be enough to bring the power below the server's even share. For example, such situations may include: (1) a VM placement where the non-user-facing VMs are poorly balanced across servers, (2) not enough non-user-facing VMs in the workload mix, (3) non-user-facing VMs exhibiting very low utilization, or (4) a controller bug affecting power. In such a case, the out-of-band mechanism (e.g., RAPL) will eventually kick in as backup. Though RAPL will apply to all cores indiscriminately, in this example, protection from overdraw must take precedence over performance degradation. In this example, per-VM power controller 410 may lift the power cap after some time (e.g., after 30 seconds), allowing all cores to return to maximum performance.

Although per-VM controller 410 protects user-facing VMs over non-user-facing one, it does provide fairness within each VM type. In one example, per-VM controller 410 selects random cores to throttle from the non-user-facing VMs, achieving statistical fairness through randomness; on average, a non-user-facing VM may have twice as many cores throttled than a non-user-facing VM of half its size. Within the user-facing group, all VMs may be affected evenly as a mechanism like RAPL lowers the frequency of all cores at the same time.

Figure 5:
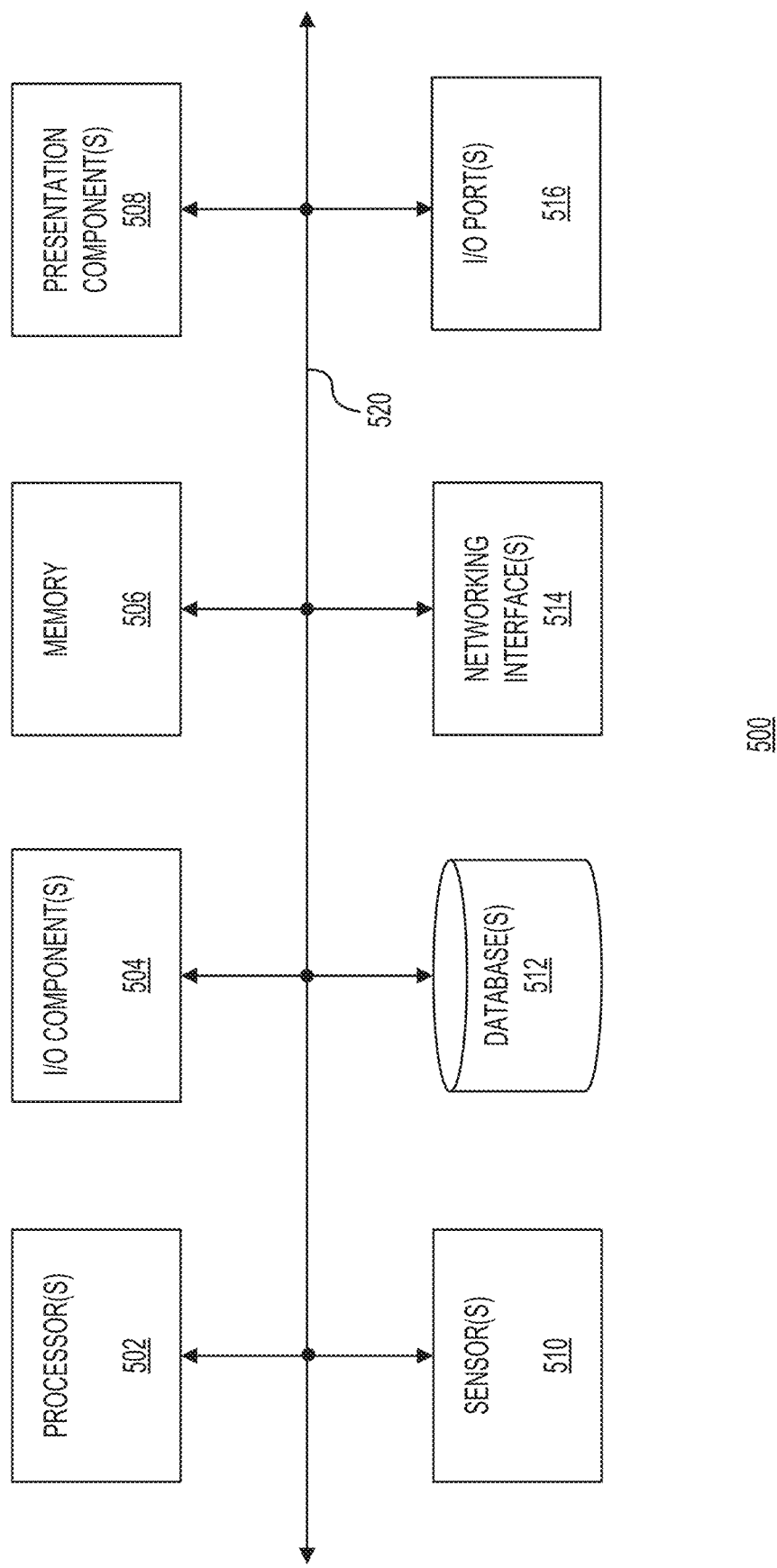
FIG. 5 is a block diagram of a system for performing methods associated with the present disclosure in accordance with one example.

FIG. 5 is a block diagram of a system 500 for performing methods associated with the present disclosure in accordance with one example. System 500 may include a processor(s) 502, I/O component(s) 504, memory 506, presentation component(s) 508, sensors 510, database(s) 512, networking interfaces 514, and I/O port(s) 516, which may be interconnected via bus 520. Processor(s) 502 may execute instructions stored in memory 506. I/O component(s) 504 may include components such as a keyboard, a mouse, a voice recognition processor, or touch screens. Memory 506 may be any combination of non-volatile storage or volatile storage (e.g., flash memory, DRAM, SRAM, or other types of memories). Presentation component(s) 508 may include displays, holographic devices, or other presentation devices. Displays may be any type of display, such as LCD, LED, or other types of display. Sensor(s) 510 may include telemetry or other types of sensors configured to detect, and/or receive, information (e.g., collected data). Sensor(s) 510 may include telemetry or other types of sensors configured to detect, and/or receive, information (e.g., conditions associated with the various devices in a data center). Sensor(s) 510 may include sensors configured to sense conditions associated with CPUs, memory or other storage components, FPGAs, motherboards, baseboard management controllers, or the like. Sensor(s) 510 may also include sensors configured to sense conditions associated with racks, chassis, fans, power supply units (PSUs), or the like. Sensor(s) 510 may also include sensors configured to sense conditions associated with Network Interface Controllers (NICs), Top-of-Rack (TOR) switches, Middle-of-Rack (MOR) switches, routers, power distribution units (PDUs), rack level uninterrupted power supply (UPS) systems, or the like.

Still referring to FIG. 5, database(s) 512 may be used to store any of the data collected or logged as described with respect to FIGS. 1-4 and as needed for the performance of methods described herein. Database(s) 512 may be implemented as a collection of distributed databases or as a single database. Network interface(s) 514 may include communication interfaces, such as Ethernet, cellular radio, Bluetooth radio, UWB radio, or other types of wireless or wired communication interfaces. I/O port(s) 516 may include Ethernet ports, Fiber-optic ports, wireless ports, or other communication ports. Although FIG. 5 shows system 500 as including a certain number of components arranged and coupled in a certain way, it may include fewer or additional components arranged and coupled differently. In addition, the functionality associated with system 500 may be distributed, as needed.

Instructions corresponding to the VM scheduler and per-VM power controller may be stored in memory 506 or another memory. These instructions when executed by processor(s) 502, or other processors, may provide the functionality associated with methods for scheduling the VMs, per-VM power capping, and achieving resource oversubscription. The ability to increase resource oversubscription and the efficacy of the per-VM power controller are highly dependent on the placement of VMs in each server cluster. Specifically, the placement should achieve: (1) a balanced distribution of power draws across the chassis to reduce the number of power capping events and (2) a balanced distribution of cap-able power (drawn by non-user-facing VM cores) across servers so that the controller can bring server power down during an event without affecting important workloads. At the same time, in this example, the VM placement must remain effective at packing VMs while minimizing the number of deployment failures.

To achieve these goals, the provider's VM scheduler may be modified to become criticality and utilization aware, using predictions from the ML and prediction-serving system at VM deployment time. The placement policy may be implemented as a preference rule that sorts the servers according to (1) the predicted workload type and 95th-percentile CPU utilization of the arriving VM and (2) the predicted characteristics of the VMs that have already been placed on each server. As a preference rule, in this example, the policy does not interfere with the ability to tightly pack or deploy VMs.

Figure 6:
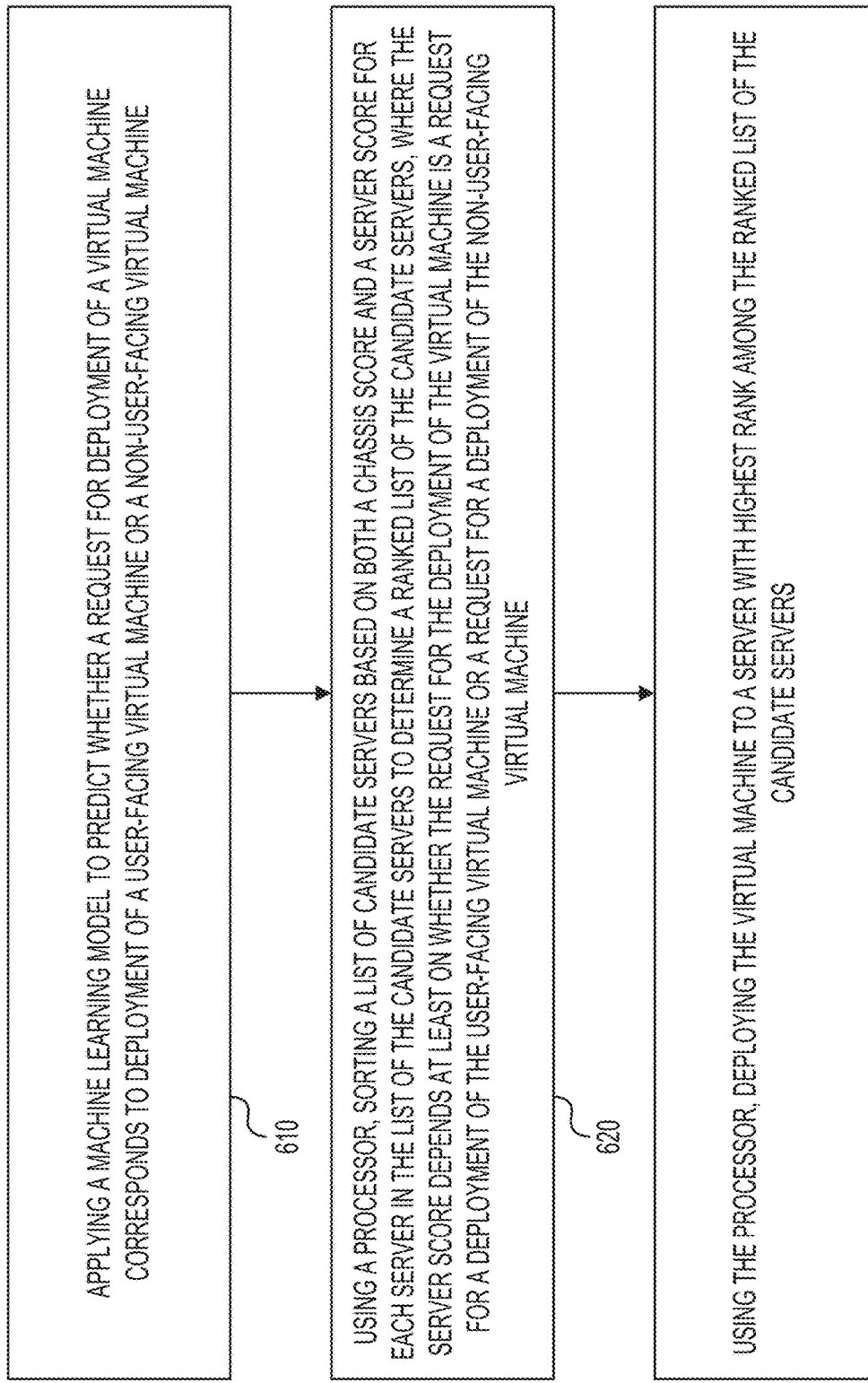
FIG. 6 shows a flow chart of a method for deploying virtual machines to servers housed in respective chassis in accordance with one example.

FIG. 6 shows a flow chart 600 of a method, implemented by a processor, for deploying virtual machines to servers housed in respective chassis. Step 610 may include applying a machine learning model to predict whether a request for deployment of a virtual machine corresponds to deployment of a user-facing virtual machine or a non-user-facing virtual machine. As explained earlier, with respect to FIGS. 1-4, the machine learning model may be trained offline and then as part of this step based on the features associated with the virtual machine, a prediction may be made with respect to whether the request corresponds to a user-facing virtual machine or a non-user-facing virtual machine.

Step 620 may include using a processor (e.g., processor(s) 502 of FIG. 5), sorting a list of candidate servers based on both a chassis score and a server score for each server in the list of candidate servers to determine a ranked list of candidate servers, where the server score depends at least on whether the request for the deployment of the virtual machine is a request for a deployment of the user-facing virtual machine or a request for a deployment of the non-user-facing virtual machine. Table 1 below shows an example algorithm for sorting the list of candidate servers.

TABLE 1

1: function SORTCANDIDATES(V, $\zeta$)
    V: VM to be placed, $\zeta$: list of candidate servers
2:   $\omega \leftarrow V^{Predicted\ Workload\ Type}$
3:   for $c_i$ in $\zeta$ do
4:     $\kappa_i \leftarrow$ SCORECHASSIS($c_i$.Chassis)
5:     $\eta_i \leftarrow$ SCORESERVER($\omega$, $c_i$)
6:     $c_i$.score $\leftarrow \alpha \times \kappa_i + (1 - \alpha) \times \eta_i$
7:   end for
8:   return $\zeta$.SORTDESC($c_i$.score)
9: end function
10:
11: function SCORECHASSIS(C)
12:   for $n_i$ in C.Servers do
13:     for $v_j$ in $n_i^{VMs}$ do
14:       $\rho^{Peak} \leftarrow \rho^{Peak} + v_j^{PredictedP95Util} \times v_j^{cores}$
15:     end for
16:     $\rho^{Max} \leftarrow \rho^{Max} + n_i^{cores}$
17:   end for 18:   return $1 - \left[\dfrac{\rho^{Peak}}{\rho^{Max}}\right]$ 19: end function
20:
21: function SCORESERVER($\omega$, N)
22:   for $v_i$ in $N^{UF\_VMs}$ do
23:     $\gamma^{UF} \leftarrow \gamma^{UF} + v_i^{PredictedP95Util} \times v_i^{cores}$
24:   end for
25:   for $v_i$ in $N^{NUF\_VMs}$ do
26:     $\gamma^{NUF} \leftarrow \gamma^{NUF} + v_i^{PredictedP95Util} \times v_i^{cores}$
27:   end for
28:   if $\omega$ = UF then 29:     return $\dfrac{1}{2} \times \left(1 + \dfrac{\gamma^{NUF} - \gamma^{UF}}{N^{cores}}\right)$ 30:   else 31:     return $\dfrac{1}{2} \times \left(1 + \dfrac{\gamma^{UF} - \gamma^{NUF}}{N^{cores}}\right)$ 32:   end if
33: end function In the example algorithm, the SORTCANDIDATES function uses two supporting routines: SCORECHASSIS and SCORESERVER. The algorithm uses ML-system produced predictions related to whether the VM is going to be a user-facing VM or a non-user-facing VM (represented by PredictedWorkloadType superscript) and the predicted utilization (represented by PredictedP95Util superscript). The algorithm ultimately computes an overall score for each candidate server (line #6). The higher the overall score, the more preferable the server. The overall score is a function of how preferable the server (line #5) and its chassis (line #4) are for the VM to be placed. In this example, both intermediate scores range from 0 to 1. In this example, the intermediate scores are weighted to give them differentiated importance.

The SCORECHASSIS function computes the chassis score for a candidate server by conservatively estimating its aggregate chassis CPU utilization (e.g., assuming all VMs scheduled to the chassis are at their individual 95th-percentile utilization at the same time). This value is computed by summing up the predicted 95th-percentile utilizations for the VMs scheduled to the chassis and dividing the sum by the maximum core utilization (number of cores in the chassis× 100%). This ratio is proportional to the utilization. 1 is subtracted from this computed value, so that higher values are better (line #18).

The SCORESERVER function scores a candidate server differently depending on the type of VM that is being deployed. First, it sums up the predicted 95th-percentile utilizations of the user-facing VMs (line #22-24) and non-user-facing VMs (lines #25-27) independently. When a user-facing VM is being deployed, a computation is made to determine how much more utilized the non-user-facing VMs on the server are than the user-facing ones. A reverse computation is performed when a non-user-facing VM is being deployed. The reversal results in balancing the capable power across servers. Adding 1 and dividing by 2 ensure that the resulting score will be between 0 and 1 (lines #29 and #31), while higher values are better. Although the algorithm in Table 1 computers predicted utilizations per chassis and per server in SCORECHASSIS and SCORESERVER, respectively, these computations need not be repeated in full for each VM deployment. Instead, these values could simply be updated (rather than fully recomputed) when each VM arrives or departs.

Step 630 may include using the processor, deploying the virtual machine to a server with highest rank among the ranked list of the candidate servers.

Prior approaches to power capping have relied upon actual knowledge of the server utilization. This approach to oversubscription works well when workloads and their server placements are known. Unfortunately, public cloud platforms violate these assumptions in multiple ways. First, each server runs many VMs, each with their workload, performance, and power characteristics. Hence, throttling the entire server would impact performance-critical and non-critical workloads alike. Second, VMs dynamically arrive and depart from each server, producing varying mixes of characteristics and preventing predefined server groupings or priorities. Third, each VM must be treated as a black box, as customers are often reluctant to accept deep inspection of their VMs' behaviors. Thus, it is difficult to determine which VMs are performance-critical and which ones are not. An oversubscription and server deployment strategy that uses the per-VM power capping system, the placement policy, historical VM arrivals, and historical power draws, to increase server density in the data centers is described. In this example, this strategy relies on the nine-step algorithm shown in Table 2 for computing an aggressive power budget for each chassis. Adapting the algorithm to find budgets for larger aggregations (e.g., each rack, each row of racks) is straightforward. The uncapped, nominal core frequency is referred to as the "maximum" frequency.

TABLE 2

Figure 7:
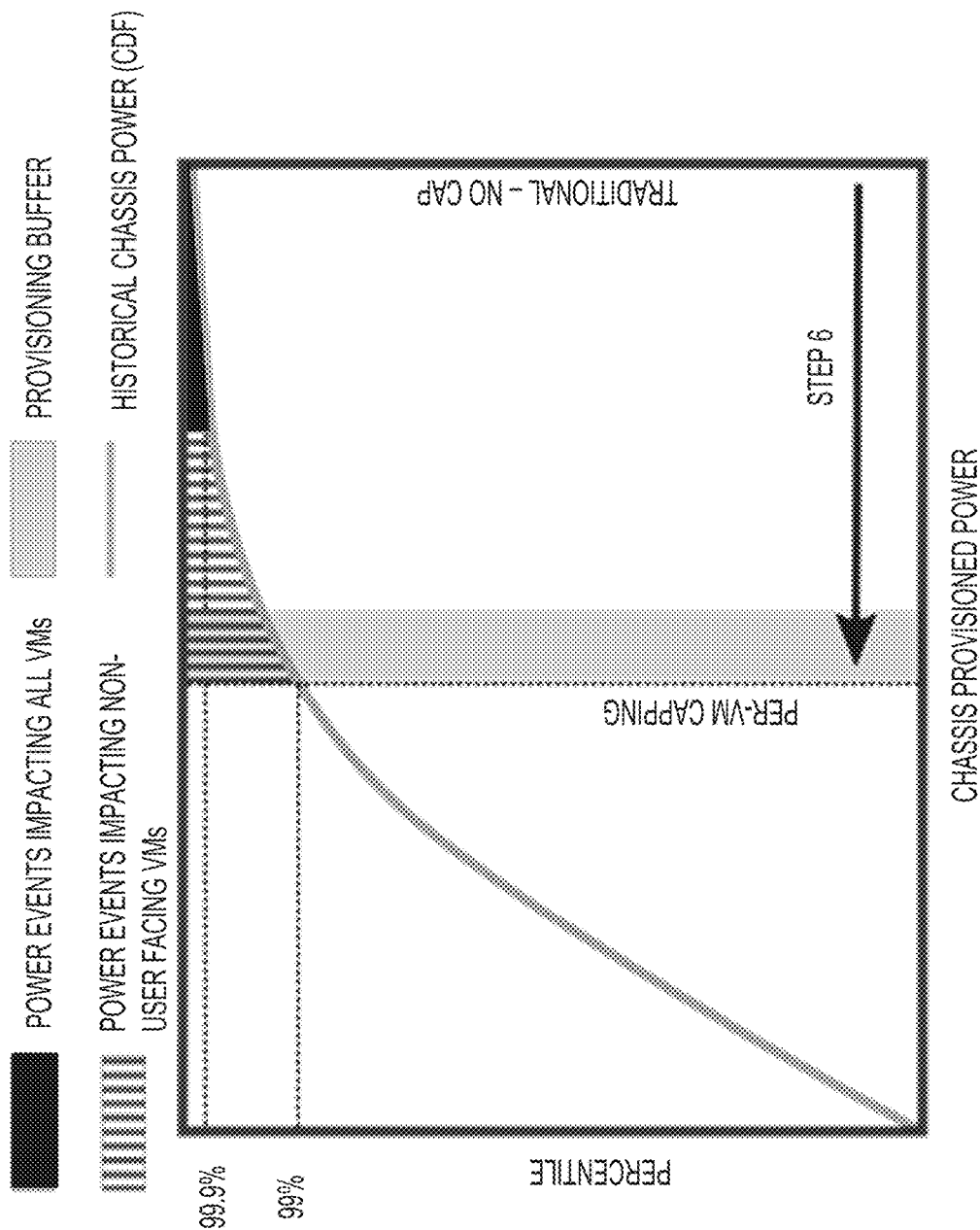
FIG. 7 shows a Cumulative Distribution Function (CDF) graph of the historical chassis power draws in accordance with one example.

1. Estimate the historical average ratio of user-facing virtual cores in the allocated cores (β). Estimate the historical average P95 utilization of virtual cores in user-facing ($util_{UF}$) and non-user-facing ($util_{NUF}$) VMs.
2. Select the maximum acceptable frequency of power capping events (e.g., number of events per week) for user-facing ($emax_{UF}$) and non- TABLE 2-continued user-facing ($emax_{NUF}$) VMs. If no power capping events are required for user-facing VMs, then set $emax_{UF} = 0$.
3. Sort the historical chassis-level power draws for all chassis with servers of the same hardware configuration (one power reading for each chassis per unit of time) in descending order.
4. Select the minimum acceptable core frequency (e.g., half the maximum frequency) for user-facing (f $min_{UF}$) and non- user-facing (f $min_{NUF}$) VMs.
If no performance loss for user-facing VMs is the requirement, then set f $min_{UF}$ = maximum frequency.
5. Estimate how much server power can be reduced by lowering core frequency (and, as a result, voltage) at $util_{UF}$ and $util_{NUF}$, given f $min_{UF}$ and f $min_{NUF}$, respectively. This step produces two curves for power draw, one for each average utilization, as a function of frequency.
6. Estimate the minimum chassis power budget (Pmin) that satisfies $emax_{UF}$, $emax_{NUF}$, f $min_{UF}$, and f $min_{NUF}$. To do so, we start from the highest power draw as the first candidate budget and progressively consider lower draws until we find $P_{min}$. For each candidate power budget, check to ensure that the frequency of capping events would not exceed f $max_{UF}$ or f $max_{NUF}$ (considering the higher draws already checked), and the attainable power reduction from capping is sufficient (given β and the curves from step 5). FIG. 7 illustrates this step using a Cumulative Distribution Function (CDF) plot of the historical chassis power draws.
7. To compute the final budget for the chassis of this hardware configuration, add a small buffer (e.g., 10%) to the budget from step 6 to account for any future variability of β or significant increases in chassis utilization.
8. Repeat steps 3-7 for chassis of each other configuration.
9. The overall budget for all chassis is the sum of their individual budgets.

The difference between the overall budget computed in step 9 and the provisioned power can be used to add more servers to the data center. Because of the protection of the user-facing VMs and the use of the VM scheduling policy, this difference is substantially larger than in prior approaches. Thus, this advantageously allows for better use of the power in a data center.

Figure 8A:
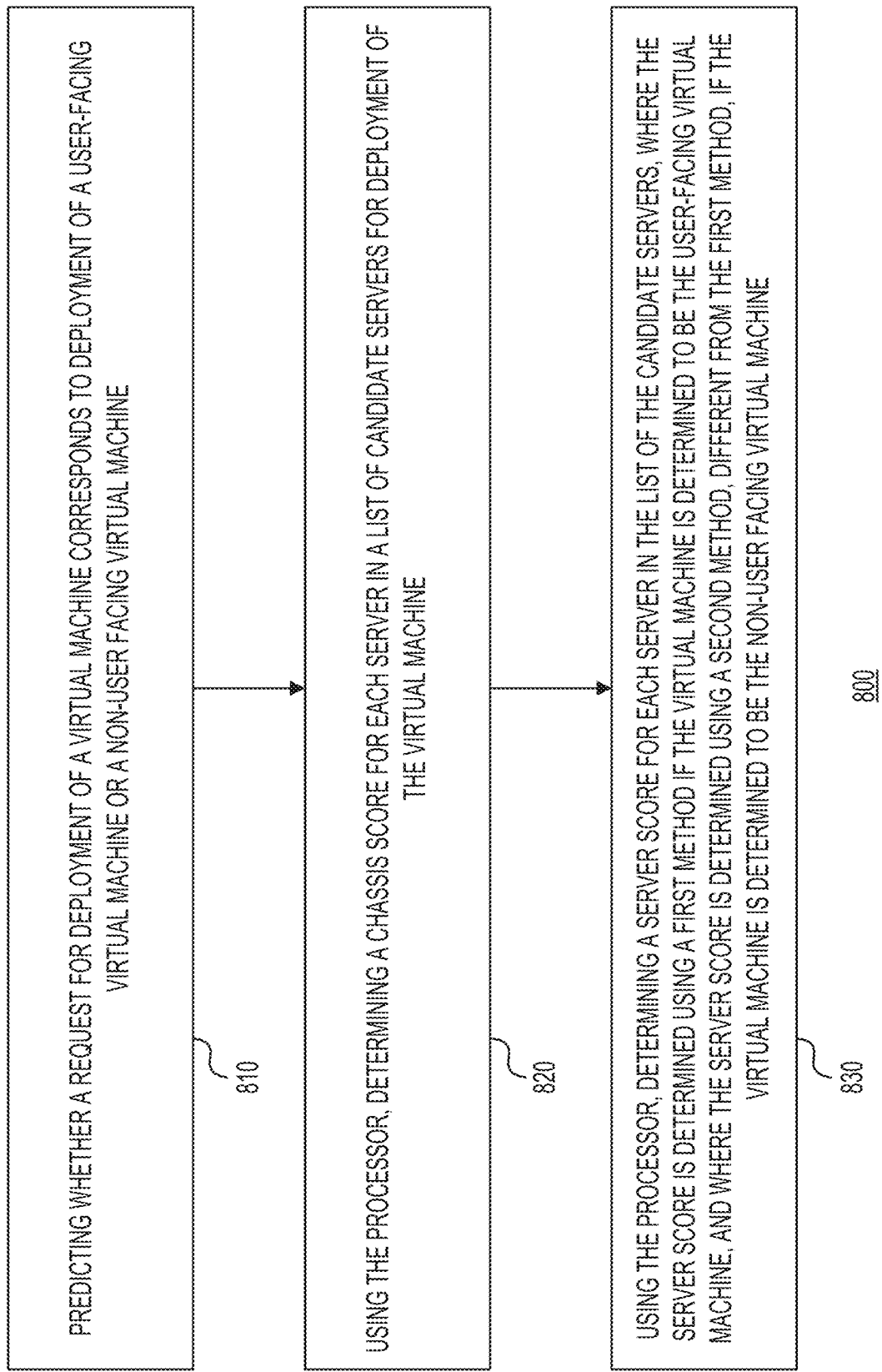
FIGS. 8A and 8B show a flowchart of a method for deploying virtual machines and capping power in accordance with one example.
Figure 8B:
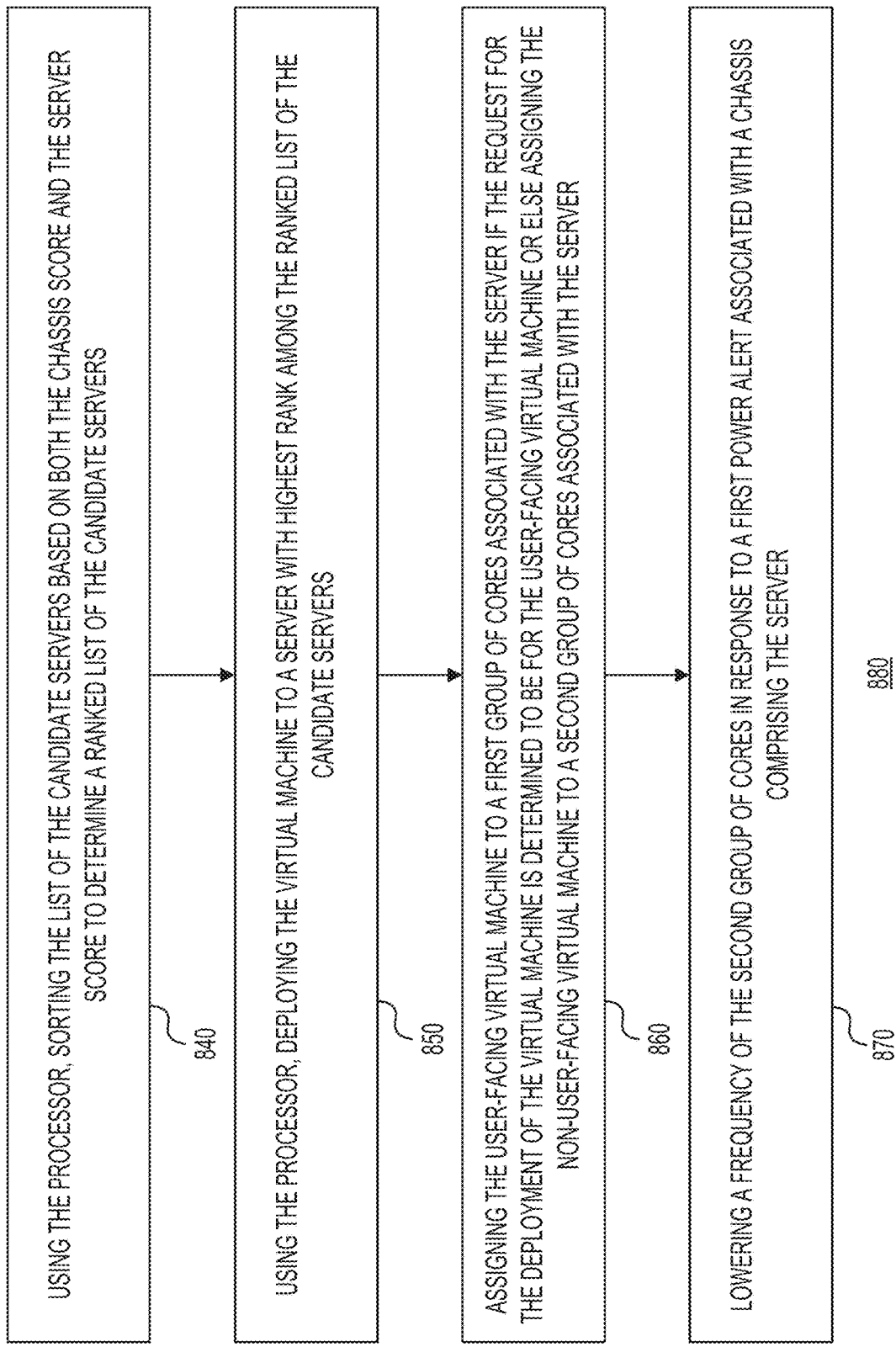

FIGS. 8A and 8B show a flow chart 800 of a method for deploying virtual machines to servers housed in respective chassis in accordance with one example. Step 810 may include predicting whether a request for deployment of a virtual machine corresponds to deployment of a user-facing virtual machine or a non-user facing virtual machine. As explained earlier, with respect to FIGS. 1-4, the machine learning model may be trained offline and then as part of this step based on the features associated with the virtual machine, a prediction may be made with respect to whether the request corresponds to a user-facing virtual machine or a non-user-facing virtual machine Step 820 may include using the processor, determining a chassis score for each server in a list of candidate servers for deployment of the virtual machine. As explained earlier with respect to FIG. 6 and Table 1, in one example, the SCORECHASSIS function computes the chassis score for a candidate server by conservatively estimating its aggregate chassis CPU utilization (e.g., assuming all VMs scheduled to the chassis are at their individual 95th-percentile utilization at the same time). This value is computed by summing up the predicted 95th-percentile utilizations for the VMs scheduled to the chassis and dividing the sum by the maximum core utilization (#cores in the chassis×100%). This ratio is proportional to the utilization. 1 is subtracted from this computed value, so that higher values are better (line #18).

Step 830 may include using the processor to determine a server score for each server in the list of the candidate servers, where the server score is determined using a first method if the virtual machine is determined to be a user-facing virtual machine, and where the server score is determined using a second method, different from the first method, if the virtual machine is determined to be a non-user facing virtual machine. As explained earlier with respect to FIG. 6 and Table 1, in one example, SCORESERVER function scores a candidate server differently depending on the type of VM that is being deployed. First, it sums up the predicted 95th-percentile utilizations of the user-facing VMs (lines #22-24 of the algorithm in Table 1) and non-user-facing VMs (lines #25-27 of the algorithm in Table 1) independently. When a user-facing VM is being deployed, a computation is made to determine how much more utilized the non-user-facing VMs on the server are than the user-facing VMs. A reverse computation is performed when a non-user-facing VM is being deployed. The reversal results in balancing the cap-able power across servers. Adding 1 and dividing by 2 ensures that the resulting score will be between 0 and 1 (lines #29 and #31 of the algorithm in Table 1), where higher values are better.

Step 840 may include using the processor to sort the list of the candidate servers based on both the chassis score and the server score to determine a ranked list of the candidate servers. As explained earlier with respect to FIG. 6 and Table 1, in one example, the overall score is a function of how preferable the server (line #5 of the algorithm in Table 1) and its chassis (line #4 of the algorithm in Table 1) are for the VM to be placed. In this example, both intermediate scores range from 0 to 1. In this example, the intermediate scores are weighted to give them differentiated importance.

Step 850 may include using the processor to deploy the virtual machine to a server with highest rank among the ranked list of the candidate servers.

Step 860 may include assigning the user-facing virtual machine to a first group of cores associated with the server if the request for the deployment of the virtual machine is determined to be for the user-facing virtual machine, or else assigning the non-user-facing virtual machine to a second group of cores associated with the server. As explained earlier, with respect to FIG. 4, per-VM controller 410 may perform this step by assigning the user-facing virtual machines (e.g., VM4) to group 432 of the cores and assigning the non-user-facing virtual machines (e.g., VM1, VM2, and VM3) to group 434 of the cores.

Step 870 may include lowering a frequency of the second group of cores in response to a first power alert associated with a chassis comprising the server. As explained earlier, with respect to FIG. 4, per-VM controller 410 may perform this step by lowering the frequency of cores assigned to group 434 of cores in FIG. 4.

In conclusion, the present disclosure relates to a method, implemented by a processor, for deploying virtual machines to servers housed in respective chassis. The method may include applying a machine learning model to predict whether a request for deployment of a virtual machine corresponds to deployment of a user-facing virtual machine or a non-user-facing virtual machine. The method may further include using the processor, sorting a list of candidate servers based on both a chassis score and a server score for each server in the list of the candidate servers to determine a ranked list of the candidate servers, where the server score depends at least on whether the request for the deployment of the virtual machine is a request for a deployment of the user-facing virtual machine or a request for a deployment of the non-user-facing virtual machine. The method may further include using the processor, deploying the virtual machine to a server with highest rank among the ranked list of the candidate servers.

The machine learning model may be configured to predict whether the request for the deployment of the virtual machine corresponds to the deployment of a user-facing virtual machine or a non-user-facing virtual machine based on a predicted resource utilization pattern associated with the virtual machine. The server score for each server may take into consideration a difference in a predicted utilization of each server by user-facing virtual machines and a predicted utilization of each server by non-user-facing virtual machines. The predicted utilization of each server by user-facing virtual machines and the predicted utilization of each server by non-user-facing virtual machines may be determined by applying a second machine learning model.

The chassis score for each server may take into consideration a sum of the predicted utilization of all virtual machines scheduled for a chassis housing a respective server. The method may further include assigning the user-facing virtual machine to a first group of cores associated with the server if the request for the deployment of the virtual machine is determined to be for a user-facing virtual machine, or else assigning the non-user-facing virtual machine to a second group of cores associated with the server. The method may further include lowering a frequency of the first group of cores in response to a second power alert associated with the chassis comprising the server.

In another example, the present disclosure relates to a system, including a processor, for deploying virtual machines to servers housed in respective chassis. The system may be configured to apply a machine learning model to predict whether a request for deployment of a virtual machine corresponds to deployment of a user-facing virtual machine or a non-user-facing virtual machine. The system may further be configured to sort a list of candidate servers based on both a chassis score and a server score for each server in the list of the candidate servers to determine a ranked list of the candidate servers, where the server score depends at least on whether the request for the deployment of the virtual machine is a request for a deployment of a user-facing virtual machine or a request for a deployment of a non-user-facing virtual machine. The system may further be configured to, using the processor, deploy the virtual machine to a server with highest rank among the ranked list of the candidate servers.

The machine learning model may be configured to predict whether the request for the deployment of the virtual machine corresponds to the deployment of a user-facing virtual machine or a non-user-facing virtual machine based on a predicted resource utilization pattern associated with the virtual machine. The server score for each server may take into consideration a difference in a predicted utilization of each server by user-facing virtual machines and a predicted utilization of each server by non-user-facing virtual machines. The predicted utilization of each server by user-facing virtual machines and the predicted utilization of each server by non-user-facing virtual machines may be determined by applying a second machine learning model.

The chassis score for each server may take into consideration a sum of the predicted utilization of all virtual machines scheduled for a chassis housing a respective server. The system may further be configured to assign the user-facing virtual machine to a first group of cores associated with the server if the request for the deployment of the virtual machine is determined to be for a user-facing virtual machine, or else assign the non-user-facing virtual machine to a second group of cores associated with the server.

In yet another example, the present disclosure relates to a method, implemented by a processor, for deploying virtual machines to servers housed in respective chassis. The method may include predicting whether a request for deployment of a virtual machine corresponds to deployment of a user-facing virtual machine or a non-user facing virtual machine. The method may further include using the processor, determining a chassis score for each server in a list of candidate servers for deployment of the virtual machine. The method may further include using the processor, determining a server score for each server in the list of the candidate servers, where the server score is determined using a first method if the virtual machine is determined to be a user-facing virtual machine, and where the server score is determined using a second method, different from the first method, if the virtual machine is determined to be a non-user facing virtual machine. The method may further include using the processor, sorting the list of the candidate servers based on both the chassis score and the server score to determine a ranked list of the candidate servers. The method may further include using the processor, deploying the virtual machine to a server with highest rank among the ranked list of the candidate servers. The method may further include assigning the user-facing virtual machine to a first group of cores associated with the server if the request for the deployment of the virtual machine is determined to be for the user-facing virtual machine, or else assigning the non-user-facing virtual machine to a second group of cores associated with the server. The method may further include in response to a first power alert associated with a chassis comprising the server, lowering a frequency of the second group of cores.

The method may further include lowering a frequency of the first group of cores in response to a second power alert associated with the chassis comprising the server. The list of candidate servers may comprise substantially identical servers grouped in a cluster.

The machine learning model may be configured to predict whether the request for the deployment of the virtual machine corresponds to the deployment of a user-facing virtual machine or a non-user-facing virtual machine based on a resource utilization pattern associated with the virtual machine. The server score for each server may take into consideration a difference in a predicted utilization of each server by user-facing virtual machines and a predicted utilization of each server by non-user-facing virtual machines. The predicted utilization of each server by user-facing virtual machines and the predicted utilization of each server by non-user-facing virtual machines may be determined by applying a second machine learning model.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:
1. A method, implemented by a processor, for deploying virtual machines to servers housed in respective chassis, the method comprising:
applying a machine learning model to predict whether a request for deployment of a virtual machine corresponds to deployment of a virtual machine for handling a first type of predicted workload or for handling a second type of predicted workload, different from the first type of predicted workload;

using the processor, sorting a list of candidate servers based on both a chassis score and a server score for each server in the list of the candidate servers to determine a ranked list of the candidate servers, wherein the server score depends at least on whether the request for deployment of the virtual machine corresponds to the deployment of the virtual machine for handling the first type of predicted workload or for handling the second type of predicted workload;

a virtual-machine scheduler, deploying the virtual machine (VM) to a selected server from among the ranked list of the candidate servers and informing a per-VM power controller about the deployment of the VM;

the per-VM power controller for the selected server: (1) assigning a first group of cores associated with the selected server if the deployment of the VM is for handling the first type of predicted workload or (2) assigning a second group of cores associated with the selected server, different from the first group of cores, if the deployment of the VM is for handling the second type of predicted workload; and in response to receiving a power alert associated with a chassis comprising the selected server, the per-VM power controller managing power capping events for the deployed VM based on a specified frequency of power capping events, wherein the specified frequency of power capping events depends on whether the deployment of the VM is for handling the first type of predicted workload or for handling the second type of predicted workload.

2. The method of claim 1, wherein the first type of predicted workload is a user-facing workload, and wherein the second type of predicted workload is a non-user-facing workload.

3. The method of claim 2 further comprising lowering a frequency of the second group of cores in response to the power alert associated with the chassis comprising the selected server.

4. The method of claim 1, wherein the server score for each server takes into consideration a difference in a predicted utilization of each server in the list of the candidate servers by virtual machines for handling the first type of predicted workload and a predicted utilization of each server in the list of the candidate servers by virtual machines for handling the second type of predicted workload.

5. The method of claim 4, wherein the predicted utilization of each server by the virtual machines for handling the first type of predicted workload and the predicted utilization of each server by the virtual machines for handling the second type of predicted workload is determined by applying a second machine learning model.

6. The method of claim 1, wherein the chassis score for each server takes into consideration a sum of the predicted utilization of all virtual machines scheduled for a chassis housing a respective server.

7. The method of claim 1, wherein applying the machine learning model to predict whether the request for the deployment of the virtual machine corresponds to the deployment of the virtual machine for handling the first type of predicted workload or for handling the second type of predicted workload comprises inferring a predicted resource utilization pattern associated with the virtual machine.

8. A system, including a processor, for deploying virtual machines to servers housed in respective chassis, the system configured to:

apply a machine learning model to predict whether a request for deployment of a virtual machine corresponds to deployment of a virtual machine for handling a first type of predicted workload or for handling a second type of predicted workload, different from the first type of predicted workload;

sort a list of candidate servers based on both a chassis score and a server score for each server in the list of the candidate servers to determine a ranked list of the candidate servers, wherein the server score depends at least on whether the request for deployment of the virtual machine corresponds to the deployment of the virtual machine for handling the first type of predicted workload or for handling the second type of predicted workload;

using the processor, deploy the virtual machine to a selected server from among the ranked list of the candidate servers and inform a per-VM power controller for the selected server about the deployment of the VM;

(1) assign a first group of cores associated with the selected server if the deployment of the VM is for handling the first type of predicted workload or (2) assign a second group of cores associated with the selected server, different from the first group of cores, if the deployment of the VM is for handling the second type of predicted workload; and in response to receiving a power alert associated with a chassis comprising the selected server, using the per-VM power controller manage power capping events for the deployed VM based on a specified frequency of power capping events, wherein the specified frequency of power capping events depends on whether the deployment of the VM is for handling the first type of predicted workload or for handling the second type of predicted workload.

9. The system of claim 8, wherein the machine learning model is configured to predict whether the request for the deployment of the virtual machine corresponds to the deployment of the virtual machine for handling the first type of predicted workload or for handling the second type of predicted workload based on a predicted resource utilization pattern associated with the virtual machine.

10. The system of claim 8, wherein the server score for each server takes into consideration a difference in a predicted utilization of each server in the list of the candidate servers by virtual machines for handling the first type of predicted workload and a predicted utilization of each server in the list of the candidate servers by virtual machines for handling the second type of predicted workload.

11. The system of claim 10, wherein the predicted utilization of each server by the virtual machines for handling the first type of predicted workload and the predicted utilization of each server by the virtual machines for handling the second type of predicted workload is determined by applying a second machine learning model.

12. The system of claim 8, wherein the chassis score for each server takes into consideration a sum of the predicted utilization of all virtual machines scheduled for a chassis housing a respective server.

13. The system of claim 8, wherein the first type of predicted workload is a user-facing workload, and wherein the second type of predicted workload is a non-user-facing workload.

14. A method, implemented by a processor, for deploying virtual machines to servers housed in respective chassis, the method comprising:
- predicting whether a request for deployment of a virtual machine corresponds to deployment of a virtual machine for handling a first type of predicted workload or for handling a second type of predicted workload, different from the first type of predicted workload;
- using the processor, determining a chassis score for each server in a list of candidate servers for deployment of the virtual machine;
- using the processor, determining a server score for each server in the list of the candidate servers, wherein the server score is determined using a first method if the virtual machine is determined to be for handling the first type of predicted workload, and wherein the server score is determined using a second method, different from the first method, if the virtual machine is determined to be for handling the second type of predicted workload;
- using the processor, sorting the list of the candidate servers based on both the chassis score and the server score to determine a ranked list of the candidate servers;
- using the processor, deploying the virtual machine (VM) to a selected server from among the ranked list of the candidate servers and informing a per-VM power controller about the deployment of the VM;
- assigning the virtual machine to a first group of cores associated with the selected server if the request for the deployment of the virtual machine is determined to be for handling the first type of predicted workload, or else assigning the virtual machine to a second group of cores associated with the selected server;
- in response to receiving a power alert associated with a chassis comprising the selected server, the per-VM power controller managing power capping events for the deployed VM based on a specified frequency of power capping events, wherein the specified frequency of power capping events depends on whether the deployment of the VM is for handling the first type of predicted workload or for handling the second type of predicted workload; and
- lowering a frequency of the second group of cores in response to the power alert associated with a chassis comprising the server.

15. The method of claim 14, further comprising lowering a frequency of the first group of cores in response to the power alert associated with the chassis comprising the server.

16. The method of claim 14, wherein the list of candidate servers comprises substantially identical servers grouped in a cluster.

17. The method of claim 14, wherein predicting whether the request for the deployment of the virtual machine corresponds to the deployment of the virtual machine for handling the first type of predicted workload or for handling the second type of predicted workload comprises inferring a predicted resource utilization pattern associated with the virtual machine.

18. The method of claim 14, wherein the server score for each server takes into consideration a difference in a predicted utilization of each server in the list of the candidate servers by virtual machines for handling the first type of predicted workload and a predicted utilization of each server in the list of the candidate servers by virtual machines for handling the second type of predicted workload.

19. The method of claim 18, wherein the predicted utilization of each server by the virtual machines for handling the first type of predicted workload and the predicted utilization of each server by the virtual machines for handling the second type of predicted workload is determined by applying a machine learning model.

20. The method of claim 14, wherein the first type of predicted workload is a user-facing workload, and wherein the second type of predicted workload is a non-user-facing workload.

* * * * *